(12) United States Patent
Farooq et al.

(10) Patent No.: US 11,034,323 B2
(45) Date of Patent: Jun. 15, 2021

(54) AIRBAG ASSEMBLY INCLUDING RETRACTABLE TETHERS

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Dean M. Jaradi, Macomb, MI (US); Anil Kalra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 16/589,864

(22) Filed: Oct. 1, 2019

(65) Prior Publication Data

US 2021/0094503 A1 Apr. 1, 2021

(51) Int. Cl.
*B60R 21/2338* (2011.01)
*B60R 21/207* (2006.01)
*B60N 3/00* (2006.01)
*B60R 21/231* (2011.01)

(52) U.S. Cl.
CPC .......... *B60R 21/2338* (2013.01); *B60N 3/004* (2013.01); *B60R 21/207* (2013.01); *B60R 2021/23153* (2013.01); *B60R 2021/23386* (2013.01)

(58) Field of Classification Search
CPC .............. B60R 21/2338; B60R 21/207; B60R 2021/23153; B60R 2021/23386; B60N 3/004

See application file for complete search history.

(56) References Cited

U.S. PATENT DOCUMENTS

| | | | |
|---|---|---|---|
| 3,650,223 A * | 3/1972 | Kobori | A47C 7/70 108/44 |
| 6,308,982 B1 | 10/2001 | Wallner et al. | |
| 6,431,588 B1 | 8/2002 | Bayley et al. | |
| 10,035,484 B2 | 7/2018 | Jaradi et al. | |
| 10,232,815 B1 * | 3/2019 | Dry | B60R 21/207 |
| 2010/0276540 A1 * | 11/2010 | Rojo | B64D 25/02 244/121 |
| 2013/0327255 A1 * | 12/2013 | Pajic | B60R 11/02 108/25 |
| 2013/0341975 A1 | 12/2013 | Schneider et al. | |
| 2017/0120859 A1 * | 5/2017 | Ohno | B60R 21/2342 |
| 2018/0162253 A1 * | 6/2018 | Faruque | B60N 2/42 |
| 2018/0186325 A1 * | 7/2018 | Jaradi | B60R 21/207 |
| 2018/0326938 A1 * | 11/2018 | Rickenbach | B60R 21/233 |
| 2019/0077356 A1 | 3/2019 | Patel et al. | |

(Continued)

FOREIGN PATENT DOCUMENTS

| | | |
|---|---|---|
| EP | 0530819 A1 | 3/1993 |
| WO | 2018167899 A1 | 9/2018 |

*Primary Examiner* — Darlene P Condra
(74) *Attorney, Agent, or Firm* — Frank A. MacKenzie; Bejin Bieneman PLC

(57) ABSTRACT

An assembly includes a seat including a seatback. An airbag is supported by the seatback and is inflatable to an inflated position. A tether is connected to the airbag. A pyrotechnic device is supported by the seat and connected to the tether. As the airbag inflates to the inflated position, the pyrotechnic device pulls the tether to position the airbag.

16 Claims, 9 Drawing Sheets

(56) References Cited

U.S. PATENT DOCUMENTS

| | | | |
|---|---|---|---|
| 2019/0144121 A1* | 5/2019 | Young | B60N 3/004 |
| | | | 280/730.1 |
| 2019/0184885 A1* | 6/2019 | Preisler | B60N 2/68 |
| 2019/0299903 A1* | 10/2019 | Nagasawa | B60R 21/2338 |
| 2020/0122670 A1* | 4/2020 | Jung | B60R 21/205 |
| 2020/0283153 A1* | 9/2020 | Humbert | B64D 11/06205 |
| 2020/0331421 A1* | 10/2020 | Saito | B60N 2/42 |
| 2021/0009068 A1* | 1/2021 | Farooq | B60R 21/207 |

* cited by examiner

AIRBAG ASSEMBLY INCLUDING RETRACTABLE TETHERS

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1A:
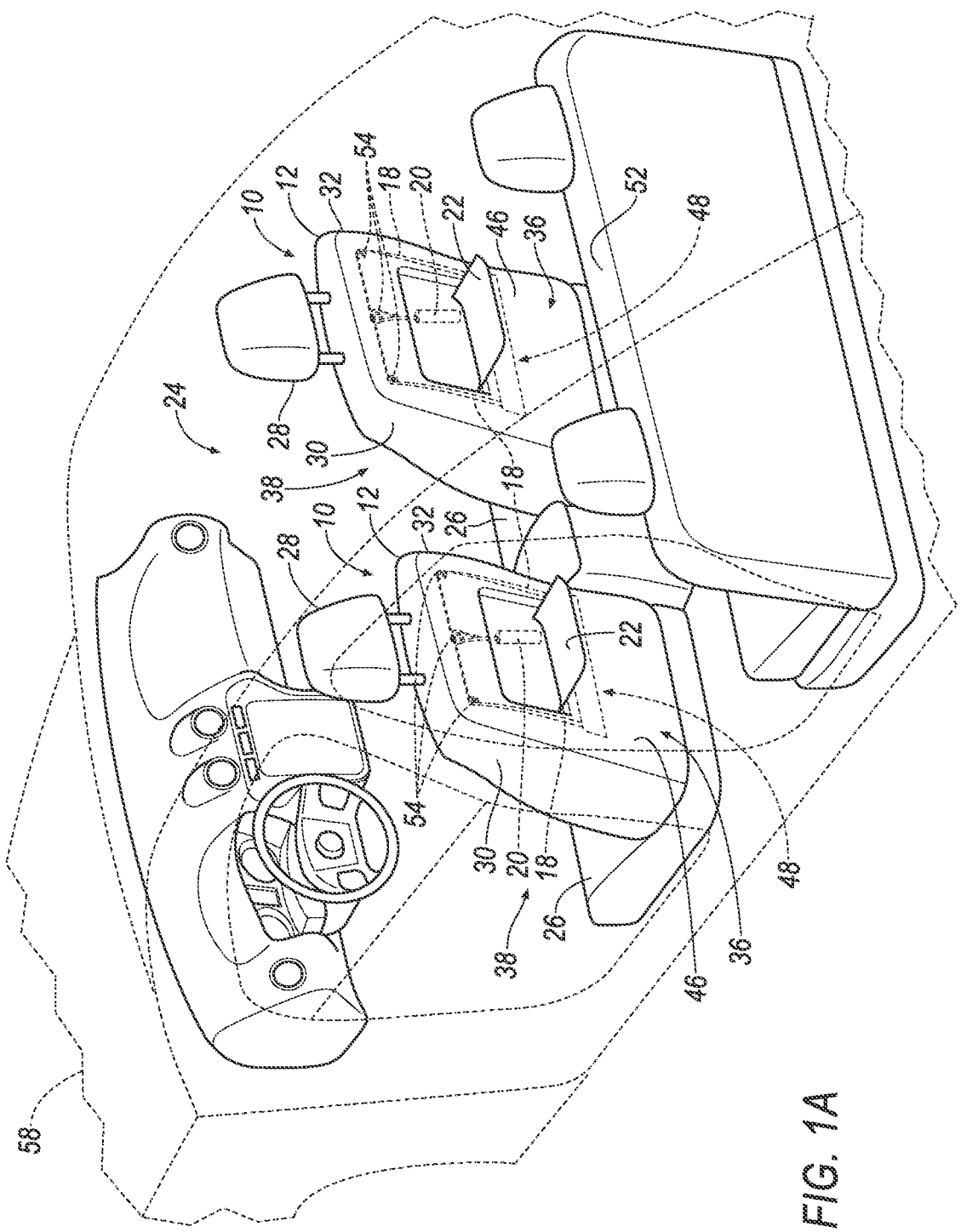
FIG. 1A is a perspective view of the vehicle including a seat with a tray in an extended position.

An assembly includes a seat including a seatback. An airbag is supported by the seatback and is inflatable to an inflated position. A tether is connected to the airbag. A pyrotechnic device is supported by the seat and connected to the tether.

The assembly may include a tray supported by the seatback between the airbag and the pyrotechnic device. A joint may be between the tray and the seatback. The pyrotechnic device is designed to move the tray about the joint. A hinge may be between the tray and the seatback, the tray being rotatable about the hinge. The pyrotechnic device may be above the tray and the tray is rotatable upwardly from an extended position to a stowed position. The pyrotechnic device may be positioned to retract the tether upwardly. The hinge may be a locking hinge. The tray may be moveable between an extended position and a stowed position, the tray in the extended position extending transversely from the seatback. The pyrotechnic device may be supported by the seatback above the tray and the airbag is supported by the seatback below the tray.

The pyrotechnic device may be supported by the seatback.

The assembly may include a second tether spaced from the tether, the second tether connected to the airbag and to the pyrotechnic device. A pulley is supported on the seat, the tether and the second tether engaging the pulley between the airbag and the pyrotechnic device.

The assembly may include a computer having a processor and memory storing instructions executable by the processor to actuate the pyrotechnic device after initiation of inflation of the airbag. The memory may store instructions executable by the processor to initiate inflation of the airbag.

The pyrotechnic device may be designed to retract the tether toward the pyrotechnic device.

The pyrotechnic device may include a piston or a spool connected to the tether.

With reference to the Figures, wherein like numerals indicate like parts throughout the several views, an assembly of a vehicle is generally shown. The assembly includes a seat 10 including a seatback 12. The seat 10 includes an airbag 14 supported by the seatback 12. The airbag 14 is inflatable to an inflated position. A tether 18 is connected to the airbag 14. A pyrotechnic device 20 is supported by the seat 10 and is connected to the tether 18.

Figure 1B:
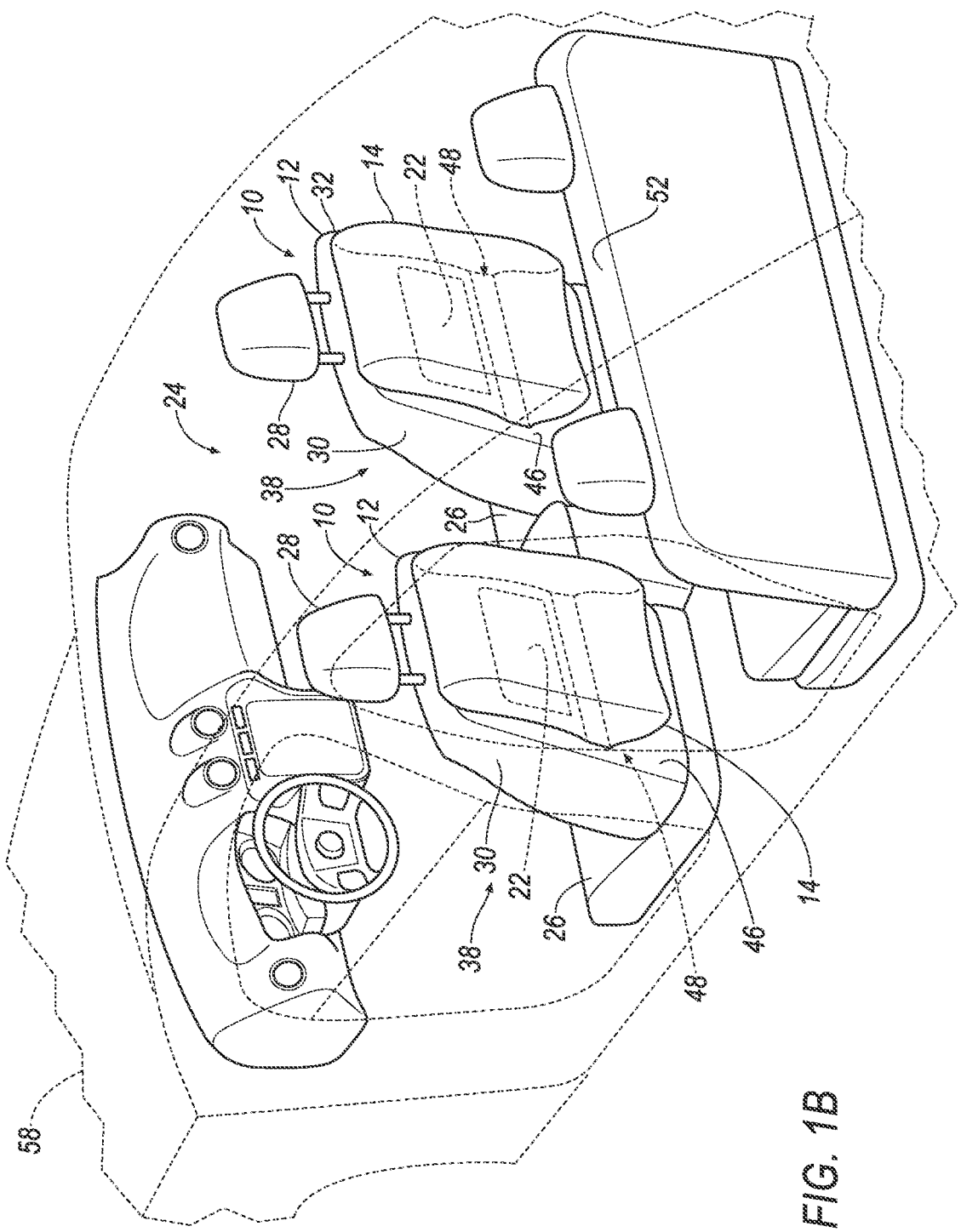
FIG. 1B is a perspective view of the vehicle including the seat with the tray in the stowed position.
Figure 2:
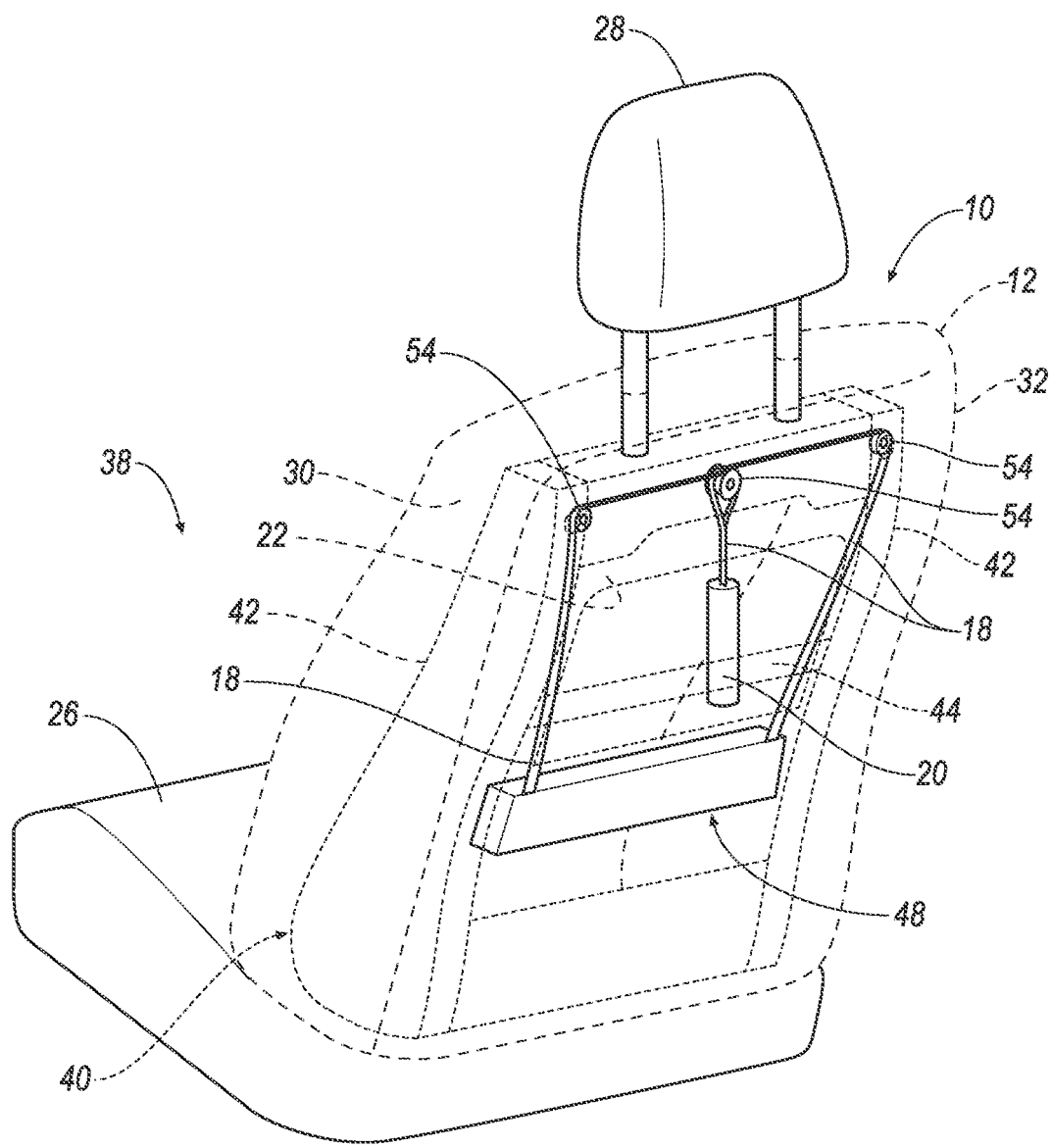
FIG. 2 is a perspective view of the seat with the airbag assembly, a tether, and a pyrotechnic device mounted to the seatback.

The airbag 14 is inflatable to the inflated position, shown in FIG. 1B, to control the kinematics of the vehicle occupant. The pyrotechnic device 20 pulls the tether 18 to position the airbag 14 relative to the seat 10 in the inflated position. In other words, during and/or after inflation, the pyrotechnic device 20 pulls the tether 18 to pull the airbag 14. This guides the airbag 14 during inflation and/or positions the airbag 14 in the inflated position.

In one example shown in the Figures, the assembly includes a tray 22 supported on the seatback 12. The tray 22 may extend toward and be used by an occupant seated behind the seat 10. The pyrotechnic device 20 may pull the tether 18 to position the airbag 14 between the tray 22 and the rearward occupant. As an example, the activation of the pyrotechnic device 20 and the inflation of the airbag 14 may rotate the tray 22 toward the seat 10 with the airbag 14 disposed between the tray 22 and the rearward occupant.

The vehicle 58 may be any suitable type of automobile, e.g., a passenger or commercial automobile such as a sedan, a coupe, a truck, a sport utility vehicle, a crossover vehicle, a van, a minivan, a taxi, a bus, etc. The vehicle, for example may be an autonomous vehicle. In other words, the vehicle may be autonomously controlled such that the vehicle may be driven without constant attention from the driver. A computer can be programmed to operate the vehicle independently of the intervention of a human driver, completely or to a lesser degree. The computer may be programmed to operate the propulsion, brake system, steering, and/or other vehicle systems based at least in part on data received from the sensor. For purposes of this disclosure, autonomous operation means the computer controls the propulsion, brake system, and steering without input from a human driver; semi-autonomous operation means the computer controls one or two of the propulsion, brake system, and steering and a human driver controls the remainder; a nonautonomous operation means a human driver controls the propulsion, brake system, and steering.

The vehicle 58 includes a passenger cabin 24 to house occupants, if any, of the vehicle 58. The vehicle 58 includes one or more seats 10. The seats 10 may be arranged in the passenger cabin 24 in any suitable position, i.e., as front seats, rear seats, third-row seats, etc. The seats 10 may be moveable relative to the floor to various positions, e.g., movable fore-and-aft and/or cross vehicle. The seats 10 may be of any suitable type, e.g., a bucket seat 10 as shown in FIGS. 1A and 1B.

The seat 10 may include the seatback 12, a seat bottom 26, and a head restraint 28. The seatback 12 may be supported by the seat bottom 26 and may be stationary or moveable relative to the seat bottom 26. The head restraint 28 may be supported by the seatback 12 and may be stationary or movable relative to the seatback 12. The seatback 12, the seat bottom 26, and the head restraint 28 may be adjustable in multiple degrees of freedom. Specifically, the seatback 12, the seat bottom 26, and the head restraint 28 may themselves be adjustable, in other words, adjustable components within the seatback 12, the seat bottom 26, and/or the head restraint 28 may be adjustable relative to each other.

The seatback 12 includes a first side 30, a second side 32, a front 34 extending between the first side 30 and the second side 32, and a rear 36 extending between the first side 30 to the second side 32. As shown in FIG. 1A, when the seat 10 is in the forward-facing position, the front 34 of the seat 10 faces vehicle-forward and the rear 36 of the seat 10 faces vehicle-rearward.

The seatback 12 defines an occupant seating area 38 on the front 34 between the first side 30 and the second side 32. When the occupant occupies the seat 10, the back of the occupant leans against the occupant seating area 38.

The seatback 12 may include a seatback frame 40 and a covering (not numbered) supported on the seatback frame 40. The seatback frame 40 may include tubes, beams, etc. Specifically, the seatback frame 40 includes a pair of upright frame members 42 at the first side 30 and the second side 32, respectively, of the seatback 12. The upright frame members 42 are elongated and specifically, are elongated in a generally upright direction when the seatback 12 is in a generally upright position. The upright frame members 42 are spaced from each other and the seatback frame 40 may include a cross-member 44 extending between the upright frame members 42.

The seatback frame 40 may be of any suitable plastic material, e.g., carbon fiber reinforced plastic (CFRP), glass fiber reinforced semi-finished thermoplastic composite (organosheet), etc. As another example, some or all components of the seatback frame 40 may be a suitable metal, e.g., a steel, aluminum, etc.

The covering may include upholstery and padding. The upholstery may be cloth, faux leather, or any other suitable material. The upholstery may be stitched in panels around the frame. The padding may be between the covering and the seatback frame 40 and may be foam or any other suitable material. The covering may include a tear seam adjacent to the airbag 14. The airbag 14 tears and extends through the tear seam in the inflated position.

The seatback 12 may include a rear shell 46. As an example, the covering may be on the front 34 of the seatback 12, including the occupant seating area 38, and the rear shell 46 may be on the rear 36 of the seatback 12. The rear shell 46 may abut the covering at the left side and the right side of the seat 10. The rear shell 46 may be, for example, plastic.

The assembly includes an airbag assembly 48. The airbag assembly 48 may include an inflator, a housing, and the airbag 14. The airbag assembly 48 may be supported by the seatback frame 40. In examples including the housing, the housing may support the airbag 14 in the uninflated position and the inflated position. As an example, the airbag 14 may be folded in the housing when the airbag 14 is uninflated. The housing may house the airbag 14, and/or the inflator. The housing may be mounted to the seatback frame 40, e.g., one of the frame members, and/or may be a component of the seatback frame 40. The housing may be, for example, plastic.

The airbag 14 is inflatable from an uninflated position to the inflated position. Specifically, the airbag 14 inflates extends from the rear 36 of the seat 10 in the inflated position. For example, the airbag 14 extends from the rear 36 of the seat 10 toward a rearward one of the seats 52, e.g., toward the occupant seating area 38 of the rearward one of the seats 52. In such an example, in the inflated position the airbag 14 controls the kinematics of the occupant of the rearward one of the seats 52.

The inflator is in fluid communication with the airbag 14 to inflate the airbag 14 with an inflation medium such as a gas. The inflator may be, for example, a pyrotechnic inflator that uses a chemical reaction to drive inflation medium into the airbag 14. The inflator may be of any suitable type, for example, a cold gas inflator.

The airbag 14 may be a single continuous unit, e.g., a single piece of fabric. As another example, the airbag 14 may include a plurality of segments, i.e., two or more, that are attached to each other in any suitable fashion, e.g., a plurality of panels attached by stitching, ultrasonic welding. As another example, the plurality of segments may be unitary with each other, i.e., the plurality of segments, in combination are a single, uniform piece of material with no seams, joints, fasteners, or adhesives holding them together.

The airbag 14 may be of any suitable type of material, e.g., a woven polymer. For example, the airbag 14 may be a woven nylon yarn, e.g., nylon 6. Other suitable examples include polyether ether ketone (PEEK), polyehterketoneketone (PEKK), polyester, or any other suitable polymer. The woven polymer may include a coating such as silicone, neoprene, urethane, polyogranosiloxane, etc.

As set forth above, the assembly includes the tether 18 and the pyrotechnic device 20. The pyrotechnic device 20 is activatable to retract the tether 18, which pulls the airbag 14 to position the airbag 14. The tether 18 may be disposed behind the cover of the seatback 12 before inflation of the airbag 14 and activation of the pyrotechnic device 20. In such an example, the airbag 14 and the tether 18 tear the tear seam and extend through the cover at the tear seam.

The assembly may include any suitable number of tethers 18. In the example shown in the Figures, the assembly includes one tether 18 that is Y-shaped, with one arm of the Y connected to the pyrotechnic device 20, and the other two arms of the Y connected to the airbag 14. As another example, the assembly may include two tethers 18. In that example, the tethers 18 are spaced from each other in a cross-seat direction. The tether 18 may be fabric. The tether 18 may be, for example, of the same material type as the airbag 14.

The tether 18 is connected to the airbag 14. Specifically, the tether 18 may be directly connected to the airbag 14. The tether 18 is an external tether, i.e., is external to the inflation chamber of the airbag 14. The tether 18 may be connected to the airbag 14 by any suitable way, for example, stitching, splicing, ultrasonic welding, adhesive, fasteners, etc.

The tether 18 is connected to the pyrotechnic device 20. In examples including more than one tether 18, multiple tether 18 may be connected to the pyrotechnic device 20. As another example, the assembly may include more than one pyrotechnic device 20 with each pyrotechnic device 20 dedicated to one of the arms of the Y-shape of the tether 18. The tether 18 is retractably connected to the pyrotechnic device 20. Specifically, as discussed further below, the pyrotechnic device 20 pulls the tether 18 to pyrotechnic device 20 the tether 18 toward the pyrotechnic device 20 thus pulling the airbag 14.

The pyrotechnic device 20 is supported by the seatback 12. The pyrotechnic device 20 may be connected directly or indirectly to the seatback 12, e.g., the seatback frame 40.

The pyrotechnic device 20 is designed to retract the tether 18 toward the pyrotechnic device 20. In other words, the pyrotechnic device 20 retracts the tether 18 into the pyrotechnic device 20 to pull the airbag 14. The pyrotechnic device 20 is pyrotechnically activatable. The pyrotechnic device 20 has a pyrotechnic charge designed to initiate retraction. The pyrotechnic device 20 may include a spool, a linear peg, etc., connected to the tether 18 and moveable by ignition of the pyrotechnic charge to retract the tether 18. The pyrotechnic device 20 may retract the tether 18 in any suitable movement, e.g., rotary, linear, etc. The pyrotechnic device 20 may have a piston in a cylinder with the tether 18 connected to the piston. In another example, the pyrotechnic device 20 may have a spool with the tether 18 connected to the spool.

The pyrotechnic device 20 is positioned to retract the tether 18 upwardly. Specifically, when the pyrotechnic device 20 is activated, the pyrotechnic device 20 pulls the tether 18 upward at the point where the tether 18 is connected to the airbag 14. Accordingly, the activation of the pyrotechnic device 20 pulls the airbag 14 upwardly. As an example, the seat 10 may include one or more pulleys 54 that guide the tether 18 between the pyrotechnic device 20 and the airbag 14. In this example the pyrotechnic device 20 pulls the tether 18 downwardly at the pyrotechnic device 20 and upwardly at the airbag 14. In the example shown in the Figures, the seat 10 includes three pulleys 54 with one arm of the Y-shape of the tether 18 extending around two of the pulleys 54 from the pyrotechnic device 20 to the airbag 14 and another arm of the Y-shape of the tether 18 extending around two of the pulleys 54 from the pyrotechnic device 20 to the airbag 14.

Each pulley 54 is supported on the seat 10. For example, the pulley 54 may be supported by the seatback 12, e.g., the upright frame member 42, cross-member 44, etc.

The pulley 54 may include a groove that receives the tether 18. The pulley 54 may be stationary relative to the seat 10 or may rotate relative to the seat 10. In an example in which the pulley 54 rotates relative to the seat 10, the pulley 54 may include a shaft and a wheel rotatably supported on the shaft.

The tether 18 engages the pulleys 54 between the airbag 14 and the pyrotechnic device 20. In other words, when the pyrotechnic device 20 pull the tether 18, the tether 18 remain on the pulleys 54 as the tether 18 ride along the pulleys 54. The pulleys 54 define the path of the tether 18. In the example shown in the Figures, the seat 10 includes a first pulley, a second pulley, and a third pulley 54 between the second pulley 54 and the third pulley 54. One tether 18 extends from the respective pyrotechnic device 20, around the first pulley 54 and the third pulley 54 to the airbag 14. The other tether 18 extends from the respective pyrotechnic device 20, around the second pulley 54 and the third pulley 54 to the airbag 14. In such an example, both tether 18 extend around the third pulley 54.

Figure 3A:
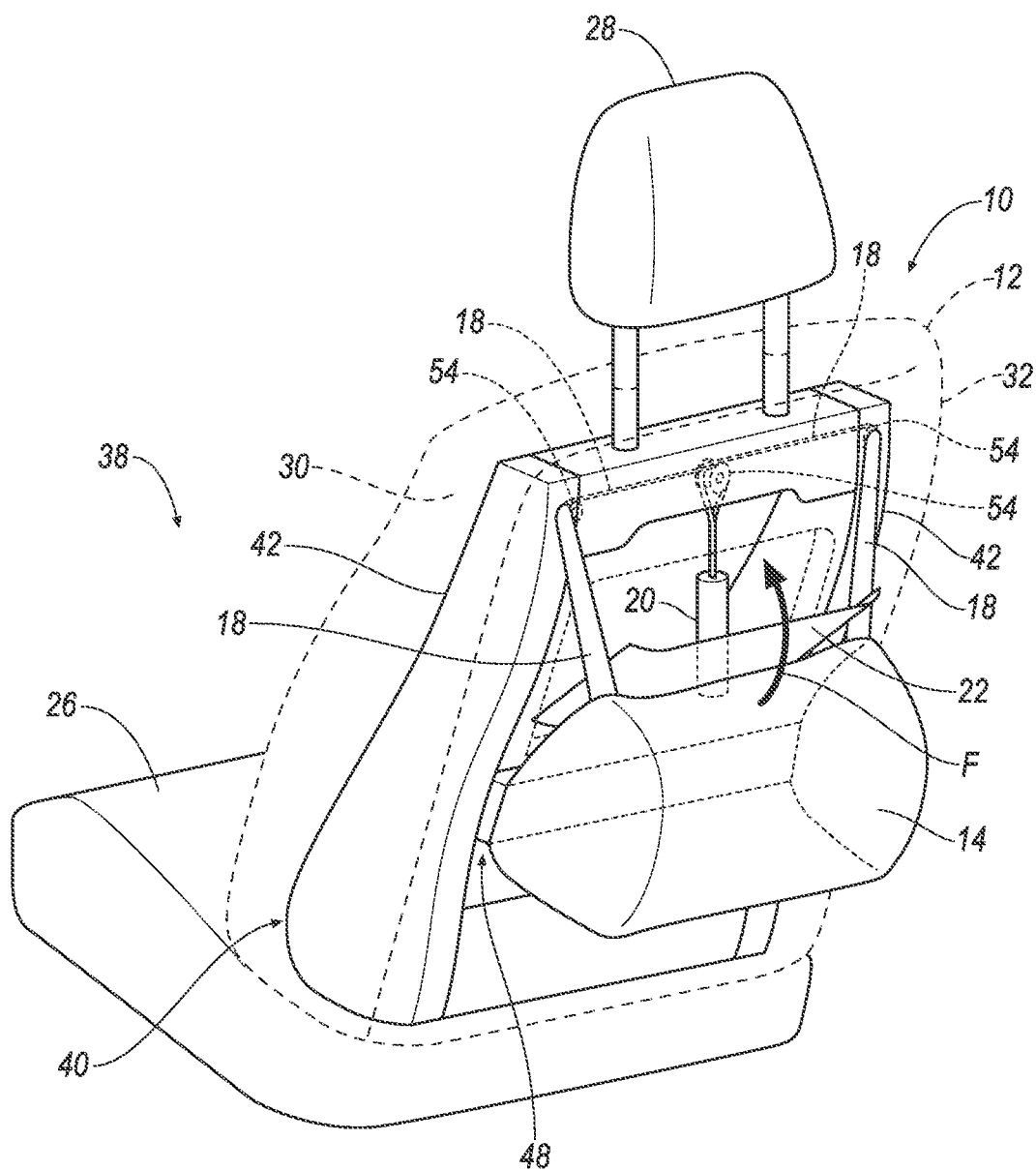
FIG. 3A is a perspective view of the seat with the airbag partially inflated and the tray moving from the extended position to the stowed position.
Figure 3B:
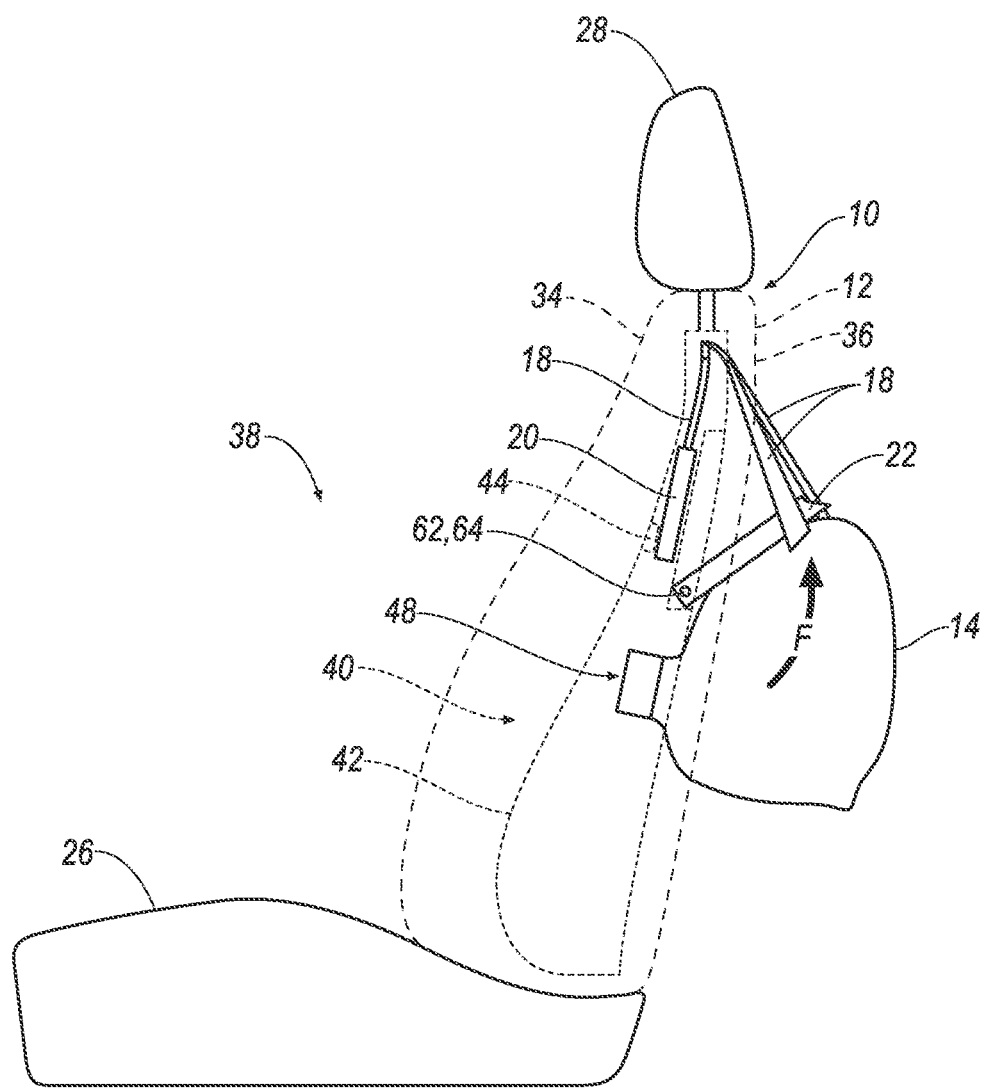
FIG. 3B is a side view of the seat with the airbag partially inflated and the tray moving from the extended position to the stowed position.
Figure 4A:
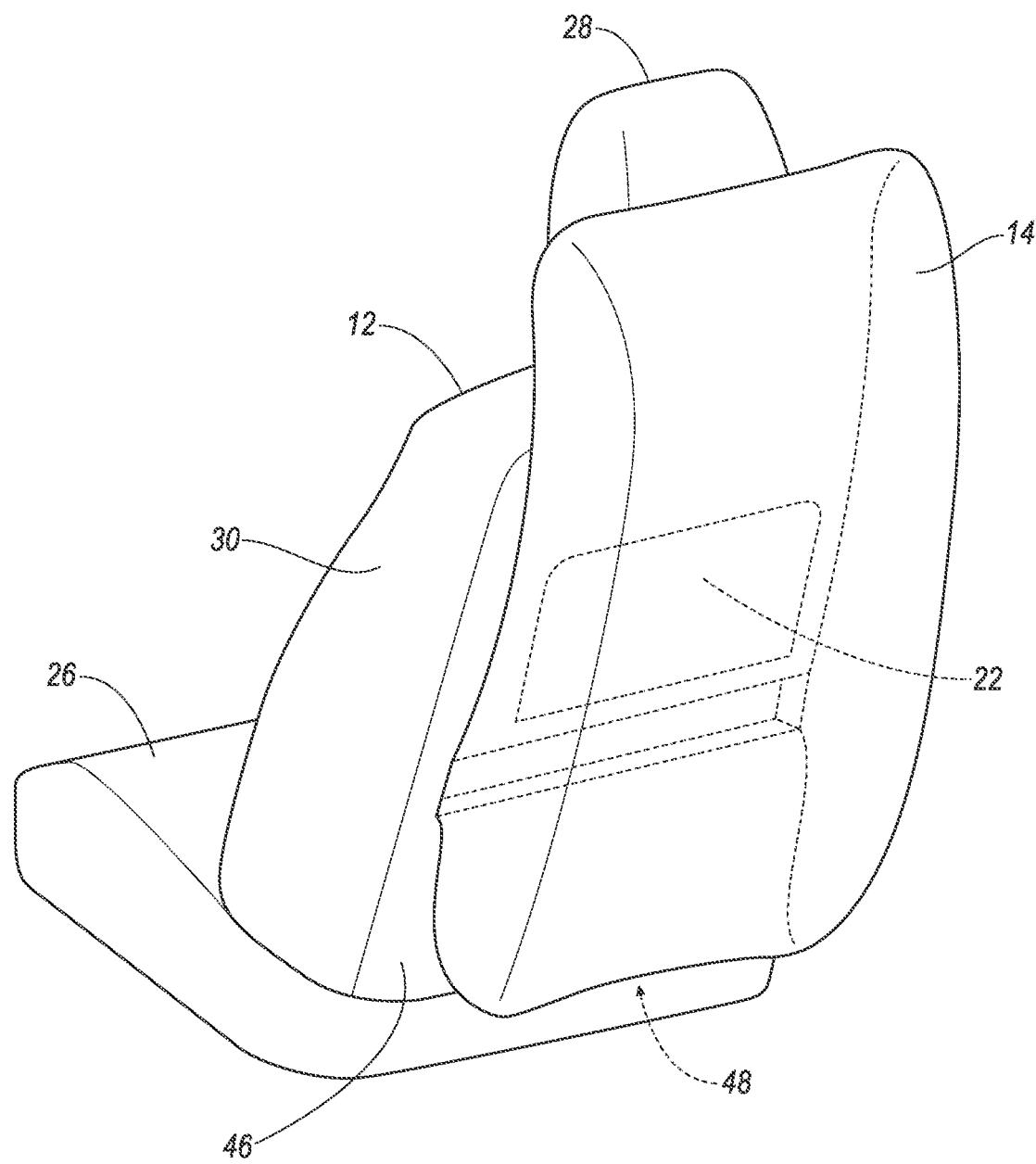
FIG. 4A is a perspective view of the seat with the airbag fully inflated and the tray table in the stowed position.
Figure 4B:
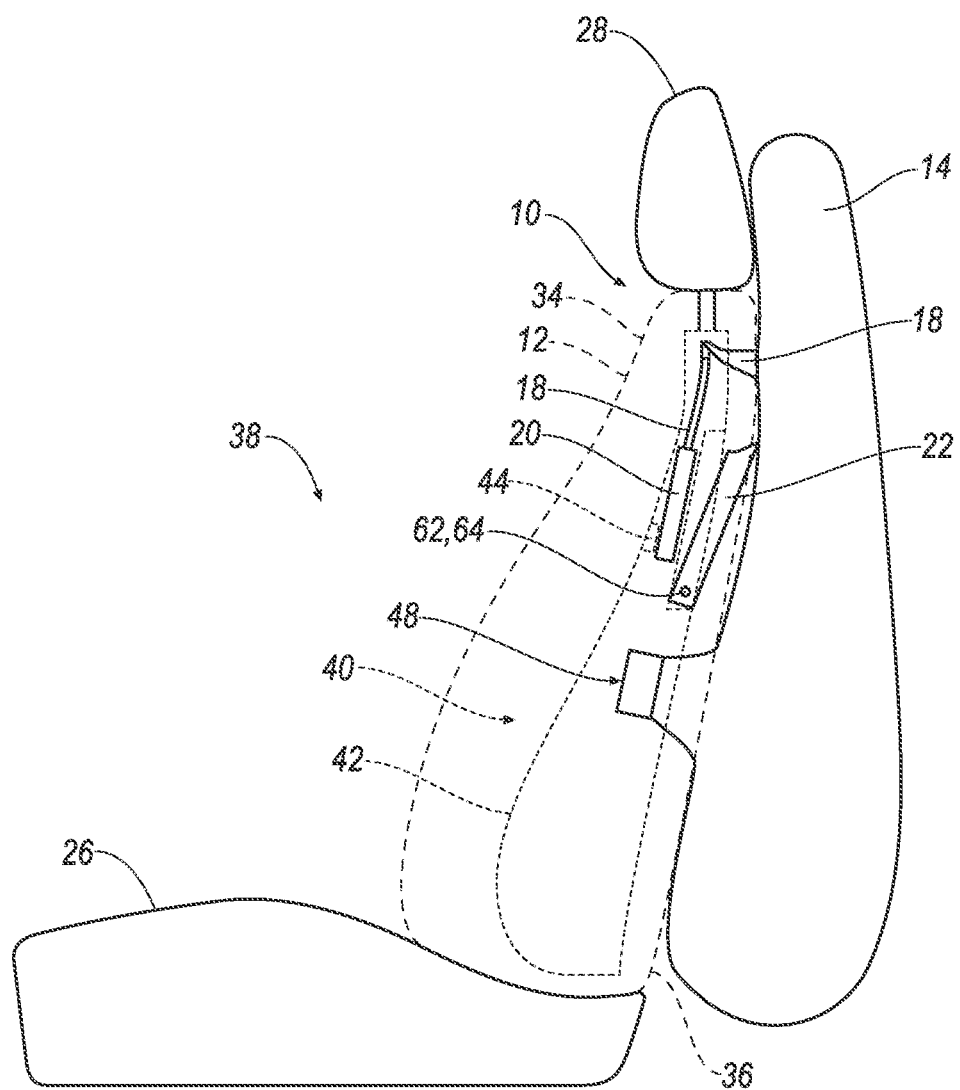
FIG. 4B is a side view of the seat with the airbag fully inflated and the tray table in the stowed position.

The tray 22 is supported by the seatback 12 between the airbag 14 and the pyrotechnic device 20. As one example, with reference to FIG. 3, the pyrotechnic device 20 is supported by the seatback 12 above the tray 22 and the airbag 14 is supported by the seatback 12 below the tray 22. Specifically, the tray 22 is supported on the rear 36 of the seatback 12. The tray 22 may be supported by the seatback frame 40. Specifically, the tray 22 is indirectly or directly supported by the seatback frame 40. As an example, the tray 22 may be engaged with the rear shell 46. The tray 22 may be of any suitable material, e.g., metal, composite, polymer, wood, etc.

The tray 22 may be moveable relative to the seatback 12 between a stowed position and an extended position (FIG. 1A). Specifically, the tray 22 may be manually moved by the rearward occupant. In such an example, the tray 22 may be rotatably connected to the rear shell 46 and/or the seatback frame 40. In examples in which the tray 22 is movable relative to the seatback 12 between the stowed and extended position s, the tray 22 may be locked in the stowed position and/or the extended position by any suitable mechanism, e.g., detents, spring-loaded pins, rotatable clips, etc.

As another example, the tray 22 may be fixed relative to the seatback 12 in the extended position, i.e., is not movable relative to the seatback 12. In such an example, the tray 22 may be unitary with the rear shell 46, i.e., a single, uniform piece of material with no seams, joint 62 s, fasteners, or adhesives holding the tray 22 and the rear shell 46 together, i.e., formed together simultaneously as a single continuous unit, e.g., by molding, forging, casting, etc. In the extended position, the tray 22 extends away from the rear 36 of the seatback 12 and transverse to the rear 36 of the seatback 12. The tray 22 may be cantilevered from the seatback 12 in the extended position.

The assembly includes a joint 62 between the tray 22 and the seatback 12. The tray 22 meets the seatback 12, e.g., the rear shell 46 and/or the seatback frame 40, at the joint 62. The joint 62 may be a rotatable joint 62. For example, the joint 62 may be a hinge 64 between the tray 22 and the seatback 12. In such examples, the hinge 64 may be of any sort, e.g., a pivot hinge 64, a barrel hinge 64, a spring hinge 64, etc. The hinge 64 may be a locking hinge (not numbered). In such examples, the locking hinge releasably retains the tray 22 in the extended position. The locking hinge includes a lock that releasably engages the tray 22 and the seatback 12 to prevent relative rotation. The lock may be, for example, a spring, a retractable pin, a detent, an electromagnet, etc. In examples including detents, the detents designed to require a minimum force to move from the extended position to the stowed position.

The pyrotechnic device 20 is designed to move the tray 22 about the joint 62. Specifically, the pyrotechnic device 20 is sized, i.e., the size of the pyrotechnic charge, positioned, etc., to move the tray 22 about the joint 62 when pulling the airbag 14 during or after inflation of the airbag 14. The pyrotechnic device 20 pulls the tether 18 with sufficient force to move the tray 22 from the extended position to the stowed position. In examples in which the joint 62 is rotatable, the pyrotechnic device 20 is designed to rotate the tray 22 from the extended position to the stowed position. Specifically, in examples in which the joint 62 is a locking hinge, the pyrotechnic device 20 is designed to overcome the lock. For example, in examples including detents, the pyrotechnic device 20 is designed to overcome the detents to move the tray 22 from the extended position to the retracted position. Similarly, in examples including a retractable pin, the pyrotechnic device 20 may be designed to break the retractable pin to move the tray 22 from the extended position to the retracted position.

The tray 22 in the extended position may be in an inflation path F of the airbag 14. In other words, the airbag 14 inflates toward the tray 22 in the extended position. In some examples, the airbag 14 inflates beyond the tray 22 in the extended position. In examples in which the tray 22 in the extended position is in the inflation path F of the airbag 14, the airbag 14 may, in conjunction with the pyrotechnic device 20, move the tray 22 from the extended position to the retracted position. Specifically, the airbag 14 impacts the tray 22 under force from the inflation and force from the pyrotechnic device 20 to move the tray 22 from the extended position to the retracted position.

The vehicle 58 includes at least one impact sensor 60 in communication. The impact sensor 60 is designed to detect an impact to the vehicle 58. The inflator 68 is activated based on detected impact. The impact sensor 60 may be of any suitable type, for example, post-contact sensors such as accelerometers, pressure sensors, and contact switches; and pre-impact sensor 60s such as radar, LIDAR, and vision-sensing systems. The vision systems may include one or more cameras, CCD image sensors, CMOS image sensors, etc. The impact sensor 60 may be located at numerous points in or on the vehicle 58. In the event of an impact, the impact sensor 60 may detect the impact and transmit a signal through the communication network 72 to the computer 70.

Figure 5:
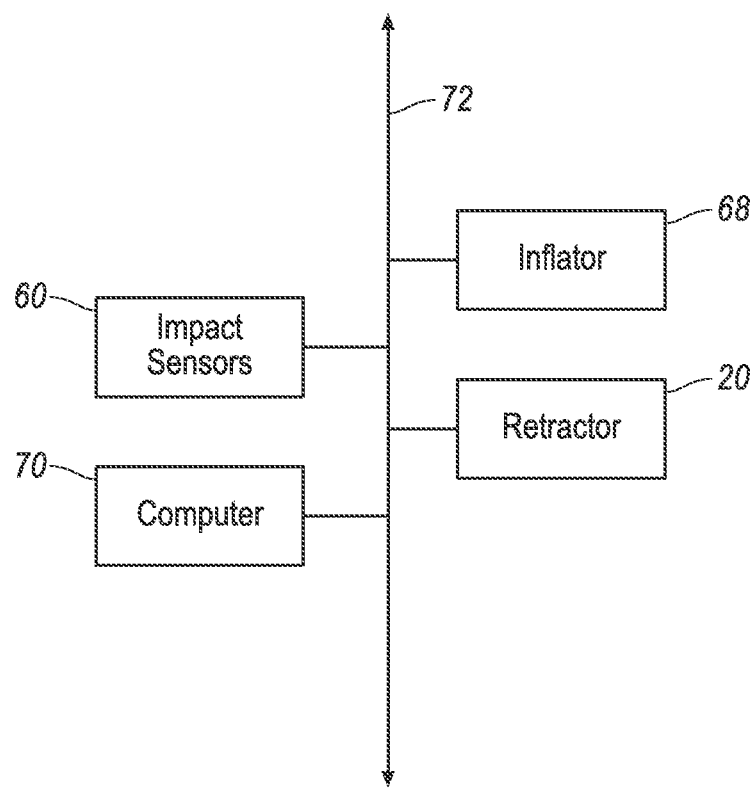
FIG. 5 is a block diagram of the communication network.

With reference to FIG. 5, the vehicle 58 includes control system including a communications network 72 and a computer 70, e.g., an airbag control module. The communications network 72 may be a controller area network (CAN) bus, Ethernet, Wi-Fi, local interconnect network (LIN), and/or by any other wired or wireless communications network 72. The computer may be in communication with the impact sensor 60 and the inflator 68 via the communications network 72.

Figure 6:
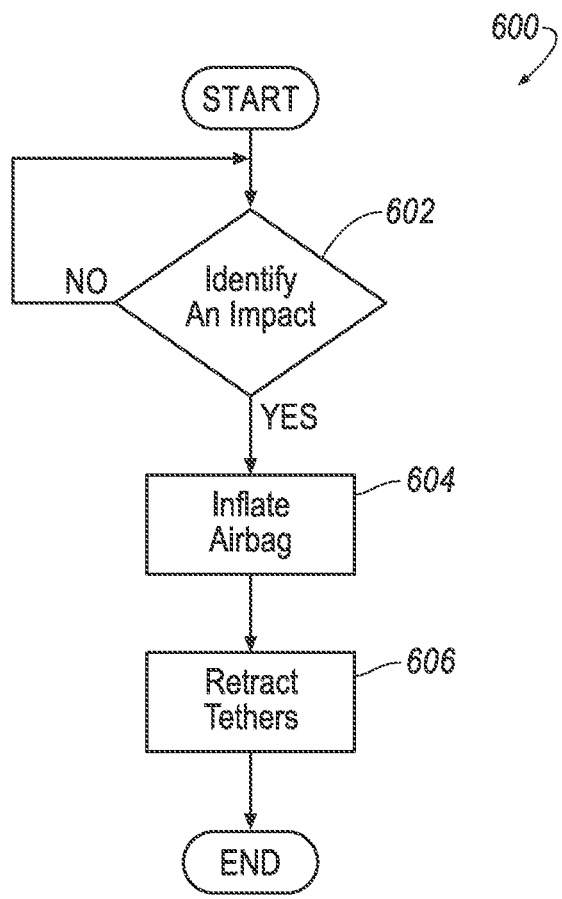
FIG. 6 is a block diagram showing the method performed by the computer.

The computer 70 may be a microprocessor-based controller. The computer 70 may include a processor, memory, etc. The memory of the computer 70 may store instructions executable by the processor as well as data and/or databases. The computer 70 is programmed to perform the method shown in FIG. 6, i.e., the memory stores instructions executable by the processor to perform the elements of the method shown in FIG. 6.

The computer 70 may be programmed to determine an impact to the vehicle 58, as shown in 602. For example, the computer 70 may determine that a vehicle 58 impact has occurred based on information received from the impact sensor 60 via the communications network 72.

The computer may be programmed to initiate inflation of the airbag 14, as shown in 604, and to actuate the pyrotechnic device 20, as shown in 606, after initiation of inflation of the airbag 14. Accordingly, the activation of the pyrotechnic device 20 pulls the airbag 14 toward the tray 22 to move the tray 22 to the retracted position.

Computing devices, such as the computer 70, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer 70 (e.g., by a processor of a computer 70). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

In operation, the airbag 14 is inflated in response to a sensed vehicle impact. As set forth above, in the inflated position the airbag 14 is positioned to control the kinematics of the vehicle occupant. In situations in which the tray 22 is in the extended position during a vehicle impact, as the pyrotechnic device 20 pulls the tether 18 and the airbag 14, the airbag 14 forces the tray 22 from the extended position to the stowed position, thus reducing the likelihood of impact between the occupant and the tray 22 and filling the space previously occupied by the tray 22 with the airbag 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
    a seat including a seatback;
    an airbag supported by the seatback and inflatable to an inflated position;
    a tether connected to the airbag;
    a pyrotechnic device supported by the seat, the tether being retractably connected to the pyrotechnic device; and
    a tray supported by the seatback between the airbag and the pyrotechnic device.

2. The assembly of claim 1, further comprising a joint between the tray and the seatback, wherein the pyrotechnic device is designed to move the tray about the joint.

3. The assembly of claim 1, further comprising a hinge between the tray and the seatback, the tray being rotatable about the hinge.

4. The assembly of claim 3, wherein the hinge is a locking hinge.

5. The assembly of claim 1, wherein the pyrotechnic device is above the tray and the tray is rotatable upwardly from an extended position to a stowed position.

6. The assembly of claim 5, wherein the pyrotechnic device is positioned to retract the tether upwardly.

7. The assembly of claim 1, wherein the tray is moveable between an extended position and a stowed position, the tray in the extended position extending transversely from the seatback.

8. The assembly of claim 1, wherein the pyrotechnic device is supported by the seatback above the tray and the airbag is supported by the seatback below the tray.

9. The assembly of claim 1, wherein the pyrotechnic device is supported by the seatback.

10. The assembly of claim 1, further comprising a second tether spaced from the tether, the second tether connected to the airbag and to the pyrotechnic device.

11. The assembly of claim 10, further comprising a pulley supported on the seat, the tether and the second tether engaging the pulley between the airbag and the pyrotechnic device.

12. The assembly of claim 1, further comprising a computer having a processor and memory storing instructions executable by the processor to actuate the pyrotechnic device after initiation of inflation of the airbag.

13. The assembly of claim 12, wherein the memory stores instructions executable by the processor to initiate inflation of the airbag.

14. The assembly of claim 1, wherein the pyrotechnic device is designed to retract the tether toward the pyrotechnic device.

15. The assembly of claim 1, wherein the pyrotechnic device includes a piston or a spool connected to the tether.

16. The assembly of claim 1, wherein the airbag is supported by the seatback below the tray, the tray is rotatable upwardly, and the pyrotechnic device is above the tray and is positioned to retract the tether upwardly to rotate the tray upwardly.

* * * * *